US008761506B1

(12) United States Patent
Padwick et al.

(10) Patent No.: US 8,761,506 B1
(45) Date of Patent: Jun. 24, 2014

(54) PAN SHARPENING DIGITAL IMAGERY

(75) Inventors: Christopher Padwick, Longmont, CO (US); Fabio Pacifici, Longmont, CO (US)

(73) Assignee: DigitalGlobe, Incorporated, Longmont, CO (US)

( * ) Notice: Subject to any disclaimer, the term of this patent is extended or adjusted under 35 U.S.C. 154(b) by 130 days.

(21) Appl. No.: 13/452,741

(22) Filed: Apr. 20, 2012

Related U.S. Application Data

(60) Provisional application No. 61/478,377, filed on Apr. 22, 2011, provisional application No. 61/478,388, filed on Apr. 22, 2011.

(51) Int. Cl.
*G06K 9/00* (2006.01)

(52) U.S. Cl.
USPC ........................................................ 382/167

(58) Field of Classification Search
CPC ............. G06K 9/00; G06K 9/32; G06K 9/36; G06K 9/40; G06T 5/50
USPC ................. 382/100, 103, 162, 191, 203, 254, 382/274–276, 284, 294, 300, 302; 342/175, 342/176, 179, 191, 192, 195, 25 A, 25 R; 345/606; 358/3.26, 3.27, 450; 348/272–273, 294, 311, 362; 702/150
See application file for complete search history.

(56) References Cited

U.S. PATENT DOCUMENTS

| | | | |
|---|---|---|---|
| 5,949,914 A | 9/1999 | Yuen | |
| 6,011,875 A | 1/2000 | Laben et al. | |
| 6,097,835 A | 8/2000 | Lindgren | |
| 6,243,483 B1 * | 6/2001 | Petrou et al. | 382/103 |
| 7,305,103 B2 | 12/2007 | Turner et al. | |
| 7,340,099 B2 | 3/2008 | Zhang | |
| 7,400,770 B2 * | 7/2008 | Keaton et al. | 382/191 |
| 7,613,360 B2 | 11/2009 | Ma et al. | |
| 7,620,203 B1 * | 11/2009 | Simmons et al. | 382/103 |
| 7,826,685 B2 | 11/2010 | Riley et al. | |
| 7,835,594 B2 * | 11/2010 | Riley et al. | 382/299 |
| 7,936,949 B2 | 5/2011 | Riley et al. | |

(Continued)

OTHER PUBLICATIONS

Garzelli, A.; Nencini, F.; Capobianco, L.; , "Optimal MMSE Pan Sharpening of Very High Resolution Multispectral Images", Geoscience and Remote Sensing, IEEE Transactions on , vol. 46, No. 1, pp. 228-236, Jan. 2008.*

(Continued)

*Primary Examiner* — Jose Couso
(74) *Attorney, Agent, or Firm* — Robert G. Crouch; Marsh Fischmann & Breyfogle LLP

(57) ABSTRACT

Method for pan sharpening a synoptic pair of multispectral images. Each multispectral image contains multiple spectral bands of M band groups, where M is a number of band groups in a range of 1 to M. A panchromatic image associated with the synoptic pair and having a p band is also provided. for each band group m in the range of 1 to M, the method includes the steps of (a) upsampling band group m; (b) pan sharpening band group m using the p band; (c) producing a pan sharpened result for band group m; and repeating steps (a)-(c) to produce pan sharpened results for each band group from 1 to M. Pan sharpened results for band groups 1 to M are fused together to produce a master fused image.

42 Claims, 12 Drawing Sheets

(10 of 12 Drawing Sheet(s) Filed in Color)

(56) References Cited

U.S. PATENT DOCUMENTS

| | | | |
|---|---|---|---|
| 8,078,009 B2 * | 12/2011 | Riley et al. ................... 382/299 |
| 8,224,082 B2 | 7/2012 | Kumar et al. |
| 8,260,086 B2 * | 9/2012 | Riley et al. ................... 382/294 |
| 8,290,301 B2 * | 10/2012 | Robinson ..................... 382/284 |
| 8,320,712 B2 | 11/2012 | Choi et al. |
| 8,478,067 B2 * | 7/2013 | Riley et al. ................... 382/276 |
| 8,493,264 B2 * | 7/2013 | Sasakawa ..................... 342/179 |
| 2002/0057438 A1 | 5/2002 | Decker |
| 2004/0234126 A1 | 11/2004 | Hampshire et al. |
| 2005/0111754 A1 | 5/2005 | Cakir et al. |
| 2006/0215907 A1 | 9/2006 | Shefer |
| 2008/0166062 A1 | 7/2008 | Adams et al. |
| 2009/0059326 A1 | 3/2009 | Hong |
| 2009/0226114 A1 | 9/2009 | Choi et al. |
| 2010/0013948 A1 | 1/2010 | Azuma et al. |
| 2012/0057049 A1 | 3/2012 | Imagawa et al. |

OTHER PUBLICATIONS

Aiazzi, B., et al: "An MTF-Based Spectral Distortion Minimizing Model for Pan-Sharpening of Very High Resolution Multispectral Images of Urban Areas", 2nd GRSS/ISPRS Joint Workshop on Data Fusion and Remote Sensing Over Urban Areas, pp. 90-94, May 2003.*

Tu et al. "A Fast Intensity-Hue-Saturation Fusion Technique With Spectral Adjustment for IKNOS Imagery", IEEE Geoscience and Remote Sensing Letters, Oct. 2004, vol. 1, No. 4.

Rahmani et al., "An Adaptive Pan Sharpening Method" IEEE Geoscience and Remote Sensing Letters, Oct. 2010, vol. 7, No. 4.

* cited by examiner (A) (B)

(C) (D)

100

PAN SHARPENING DIGITAL IMAGERY

CROSS-REFERENCES TO RELATED APPLICATIONS

This application claims priority to both provisional U.S. Patent Application Ser. No. 61/478,377, filed Apr. 22, 2011, and provisional U.S. Patent Application No. 61/478,388, filed Apr. 22, 2011, both of which are incorporated by reference as though fully set forth herein.

FIELD OF THE INVENTION

This invention relates to systems and method for pan sharpening digital imagery, including remotely-sensed multispectral imagery.

BACKGROUND OF THE INVENTION

Panchromatic imagery has lower spectral resolution and higher spatial resolution than multispectral imagery. Conversely, multispectral remotely-sensed imagery has higher spectral resolution and lower spatial resolution. While many methods have attempted to marry the two to achieve the best of both, they often result in the worst of both instead. For example, in part because the multispectral bands, specifically the red-blue-green bands, are not spectrally co-extensive with the full panchromatic band, colors are often distorted when attempting to pan sharpen the multispectral image with the panchromatic image.

One well-known color transform method in image processing is called Hue Intensity Saturation, or HIS, transform. The HIS transform is described in, for example, Gonzalez and Woods, *Digital Image Processing*, Section 6.2.3, pages 407-412, Pearson Education Inc, Upper Saddle River, N.J. 07458, which is incorporated here for all that it discloses. The HIS transform converts the red, green and blue (RGB) components of pixels in the multispectral image into values for hue (H), intensity (I) and saturation (S). When manipulating an image in the HIS color space, the values are independent so manipulation of one will not affect the others. Thus, intensity I may be manipulated without affecting the hue H or saturation S. When the manipulations are complete, the HIS color space is changed back to an adjusted RGB in a process known as reverse transformation. The multispectral image is thus "sharpened."

BRIEF SUMMARY OF THE INVENTION

The following summary is provided as a brief overview of the claimed invention. It shall not limit the invention in any respect, with a detailed and fully enabling disclosure being set forth in the Detailed Description of the invention section. Likewise, the invention shall not be limited in any numerical parameters, hardware, software, platform, or other variables, unless otherwise stated herein.

An embodiment of the present invention comprises a method for pan sharpening a first multispectral image of an area. The method comprises: providing at least a second multispectral image of the area, the first and second multispectral images comprising a synoptic pair and each multispectral image comprising multiple spectral bands of M band groups, where M is a number of band groups in a range of 1 to M; providing a panchromatic image of the geographical area, the panchromatic image comprising a p band; for each band group m in the range of 1 to M: (a) upsampling band group m; (b) pan sharpening band group m using the p band; (c) producing a pan sharpened result for band group m; and continuing steps (a)-(c) to produce pan sharpened results for each band group from 1 to M; and fusing together the pan sharpened results for band groups 1 to M to produce a master fused image.

Another embodiment comprises a method for pan sharpening a multispectral image of a location. The method comprises: providing a panchromatic image of the location, the panchromatic image having a p band; performing a forward transform of each of red, green and blue components for a pixel of the multispectral image to obtain hue, intensity and saturation bands, the intensity band having a level of spatial detail; smoothing the p band to produce a smoothed p band comprising substantially the same level of spatial detail of the intensity band; modifying the intensity band using the p band and the smoothed p band to produce a modified intensity band; obtaining a modified red component, a modified green component and a modified blue component using the modified intensity band; and using the modified red, green and blue components to sharpen the multispectral image, producing a pan sharpened multispectral image.

In yet another embodiment, the present invention comprises a method for pan sharpening a multispectral image of a location, the multispectral image having a plurality of pixels. The method comprises: providing a panchromatic image of the location, the panchromatic image having a p band; for each pixel, determining a vector x, the vector x having N spectral bands and comprising component $x_i$ where i is an index that runs from 1 to N; determining an intensity based on a length of vector x; determining a ratio of component $x_i$ to the intensity; determining an adjusted component $x_i'$ using component $x_i$; using the adjusted component $x_i'$ to calculate an adjusted vector x' to pan sharpen each pixel to produce a sharpened multispectral image.

The present invention also comprises a method for pan sharpening a multispectral image of a location, the multispectral image having N spectral bands. The method comprises: providing a panchromatic image of the location, the panchromatic image having a p band; performing a forward transform of each of red, green and blue components for a pixel of the multispectral image to obtain hue, intensity and saturation bands, the intensity band having a level of spatial detail; generating a synthetic p band from the N spectral bands using a coefficient for each of N spectral bands based on a spectral overlap between the p band and each of the spectral bands; matching an intensity of the p band with an intensity of the synthetic p band, producing an intensity matched synthetic p band; modifying the intensity band by a difference between the p band and the intensity matched synthetic p band; obtaining a modified red component, a modified green component and a modified blue component using the modified intensity band; and using the modified red, green and blue components to sharpen the multispectral image.

The present invention also comprises various embodiments of a computer-readable medium associated with an image processing system for pan sharpening multispectral image of a location. The computer readable medium includes program instructions that, when executed by one or more processors of the image processing system, cause the processors to carry out the steps of the various embodiments of the methods described.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Illustrative and presently preferred exemplary embodiments of the invention are shown in the drawings in which.

DETAILED DESCRIPTION OF THE INVENTION

Figure 1:
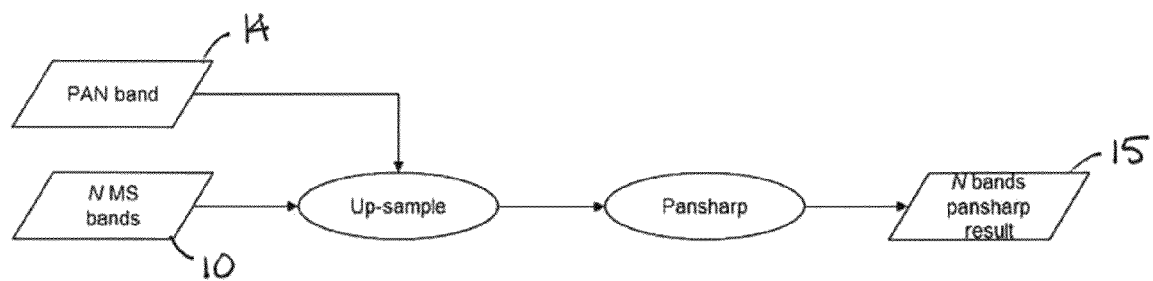
FIG. 1 illustrates a prior art process for pan sharpening of a multispectral image.

The present invention comprises methods, systems and image processing circuitry for sharpening remotely-sensed multispectral imagery of any resolution using associated panchromatic imagery, such as panchromatic image 14. Remotely-sensed imagery as used herein includes imagery of the Earth or space and should not be viewed as being limited to geospatial imagery. In addition to panchromatic image 14, remotely-sensed multispectral image 10 may be collected using a remote satellite or aerial sensor. Multispectral image 10 comprises pixels in N spectral bands and associated with other data, such as location data (e.g., geographic location). As used herein, "associated panchromatic imagery" or "panchromatic image" shall be understood as referring to an image in the panchromatic band, or p band, that corresponds to multispectral image 10 of the same or overlapping geographic location. Panchromatic image 14 may include the entire image or a portion 12 of panchromatic image 14, as well as its associated data. It should be understood that multispectral image 10 may refer to the entire image or a portion 12 of multispectral image 10 or a portion of the data associated with multispectral image 10, whether multispectral image 10 has been pre-processed or combined with other images to produce a fused image. Thus, the present invention should not be viewed as being limited to pan sharpening of an entire image or all the data associated with the remotely-sensed image or related images.

The problems addressed by the present invention may be somewhat different based on the number and type of sensors that are used to collect the remotely-sensed image. Method 100 of the present invention addresses problems created when fusing a plurality of synoptic multispectral images 10 and associated panchromatic images 14 (e.g., taken at nearly the same, but not precisely the same time.) Embodiments of method 200 of the present invention address shortcomings in prior art methods that employ both forward and reverse transformation processes. Finally, embodiments of method 300 allow for excellent quality pan sharpening of multispectral images 10 without the need for forward transform and reverse transform at all.

Method 100 comprises pan sharpening of a plurality of synoptic multispectral images and associated panchromatic imagery. A particular problem arises when attempting to register a plurality of multispectral images and the associated panchromatic image of a geographic area collected nearly synoptically in time using different banks of multispectral sensors (e.g., pushbroom sensors). These sensors collect the plurality of multispectral images 10 and the associated panchromatic image 14 at nearly, but not exactly the same, time. Because the images are collected from different sensors at slightly varying times, pixel smear, lack of crispness and color distortions may result when fusing images, especially in the case of moving objects, for example.

In prior art pan sharpening methods, such as shown in FIG. 1, all multispectral bands are first fused with the panchromatic band, or p band, in an upsampling step before pan sharpening, resulting in double the distortion over that of embodiments of method 100. The point is illustrated in an example in which two multispectral images 10 are collected synoptically by different sensors, along with the associated panchromatic image 14. In the example, object O moves with velocity $V_0$ measured in meters per second and is imaged by the sensor. The object is large enough compared to the spatial resolution of the platform so that the object is visible by the imaging platform. The first set of multispectral bands are collected at time $T_0$, the panchromatic band is collected at time $T_1$, and the second set of multispectral bands are collected at time $T_2$. Since the object is moving with respect to the imaging platform, the distance that the object travels between imaging events is computed as follows:

$$d_1 = \frac{V_0}{T_1 - T_0} \times \frac{1}{GSD} \qquad \text{Equation 1}$$

$$d_2 = \frac{V_0}{T_2 - T_1} \times \frac{1}{GSD}$$ Equation 2 where ground sample distance (GSD) is measured in units of meters and refers to a distance between adjacent pixel edges when projected through the camera of the sensor. The quantities $d_1$ and $d_2$ are measured in units of pixels since they are normalized by the ground sample distance. Assuming that the time difference between $T_0$ and $T_1$ is approximately the same as the time difference between $T_2$ and $T_1$, then the distances traveled between the two imaging events are equal:

$$T_1 - T_0 = T_2 - T_1 = \delta T$$ Equation 3

$$d_1 = \frac{V_0}{T_1} - T_0 \times \frac{1}{GSD} = \frac{V_0}{(\delta T)} \times \frac{1}{GSD}$$ Equation 4

$$d_2 = \frac{V_0}{T_2} - T_1 \times \frac{1}{GSD} = \frac{V_0}{(\delta T)} \times \frac{1}{GSD}$$ Equation 5

$$d_1 = d_1 = d$$ Equation 6

If velocity $V_0$ is high, then the object will be at different spatial locations in the imagery between imaging events. At time $T_0$, the object is at point $P_0$. At later time $T_1$, the object has traveled distance d, and at later time $T_2$ the object has traveled distance d from the last location. In total, the object travels distance 2d. Since the multispectral images 10 and the associated panchromatic image 14 are acquired at different times ($T_0$, $T_1$, $T_2$), the object is at different spatial locations in each image. The object moves a distance of 2d between times $T_2$ and $T_0$; thus, any direct mixture of the first and second set of multispectral bands as in prior art methods will exhibit a large amount of smearing as shown in pan sharpened image 15 of FIG. 3.

Figure 2:
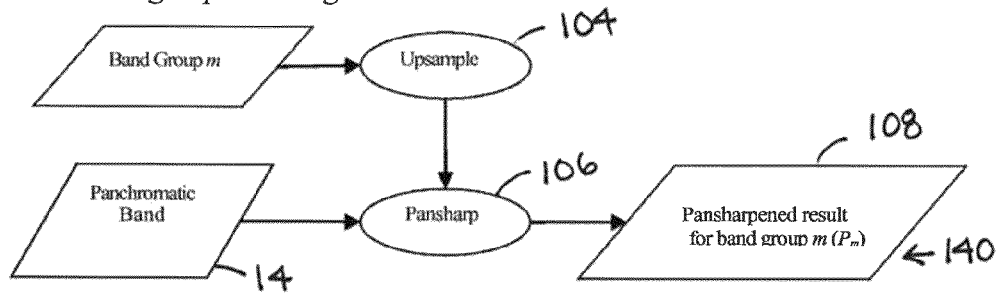
FIG. 2 illustrates an embodiment of a method for registering a plurality of synoptic multispectral images and an associated panchromatic image according to the present invention.
Figure 2:
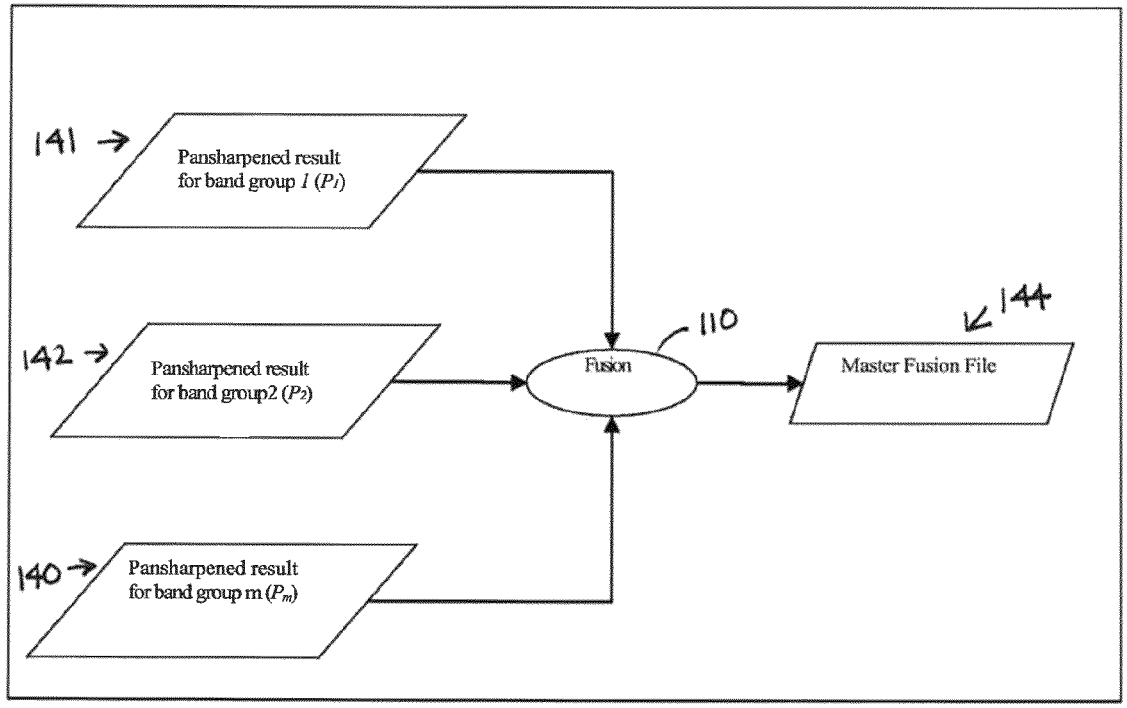

Method 100 of the present invention minimizes, and in some embodiments may eliminate, smear by separating the data fusion problem of the prior art into separate steps based on the number of multispectral bands. As shown in FIG. 2, method 100 comprises, for each set of N multispectral bands taken simultaneously or nearly synoptically, grouping 102 the multispectral bands into M distinct groups, ranging from 1 to M. The M distinct groups may, but need not be, composed of the same number of spectral bands. In one embodiment, the bands within each group m were taken at the same time. The p band may be collected separately from the multispectral bands, but this is not required. For each group of bands, m, in the range from 1 to M, method 100 further comprises: upsampling 102 group of bands m, and pan sharpening 106 group of bands m with the p band using any pan sharpening method, whether in the prior art or the pan sharpening methods of the present invention, as described in embodiments of method 200 and 300. Thus, depending on the type of pan sharpening selected, method 100 may be used without employing the forward and reverse transformation process that is used in some pan sharpening methods.

Once the group of bands m, has been pan sharpened 106, a fused, pan sharpened image $P_m$ 140 for group of bands m is produced 108.

In another embodiment, method 100 further comprises fusing 110 the pan sharpened images for group of bands m, $P_1$ and $P_2$ ($P_m$, $P_1$, $P_2$), 140, 141, 142 into master fusion file 144. While preferred in some applications, the fusing step 110 is not required.

Figure 3:
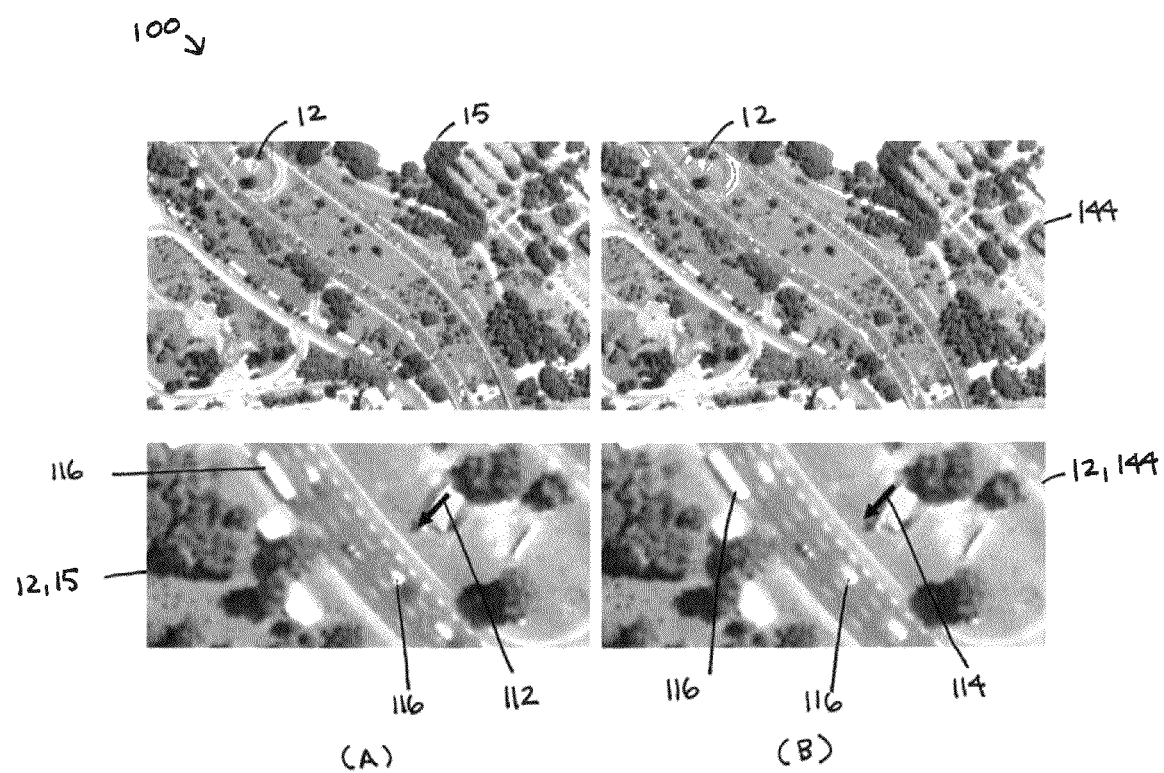
FIG. 3 is a comparison between the manner in which a prior art method (A) and an embodiment of a method of the present invention (B) address color smearing when registering a plurality of synoptic multispectral images and an associated panchromatic image.

FIG. 3 illustrates the manner in which method 100 of the present invention minimizes smear and unwanted visual artifacts resulting from the attempt to register multispectral images 10 comprising moving objects. FIG. 3 shows a comparison between the results of prior art pan sharpening methods and method 100 of the present invention. The multispectral images 10 displayed using the yellow-green-blue band combination were taken over Rio de Janeiro on Jan. 19, 2010 by the WorldView-2 satellite launched by DigitalGlobe, Inc., Longmont, Colo. FIG. 3(A) shows pan sharpening according to prior art methods. Color smearing around vehicles 116 in red and green (as highlighted by arrow 112) is visible in portion 12 of pan sharpened image 15. In contrast, FIG. 3(B) shows pan sharpening according to an embodiment of method 100 in which color smearing around vehicles 116 (as highlighted by arrow 114) has been greatly reduced as shown in portion 12 of master fusion file 144.

Figure 4:
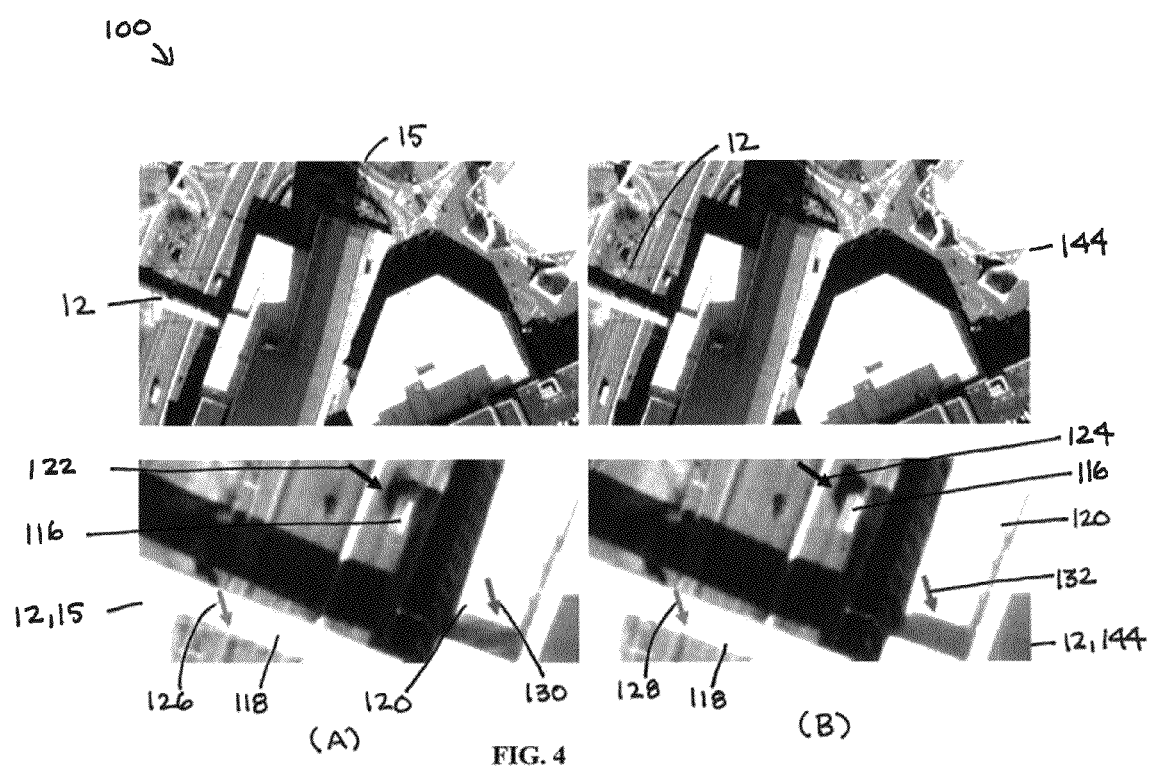
FIG. 4 is a comparison between the manner in which a prior art method (A) and an embodiment of a method of the present invention (B) address color smearing when registering a plurality of synoptic multispectral images and an associated panchromatic image.

Method 100 of the present invention may also be employed to rectify smears and discoloration caused by mis-registration between spectral bands of synoptic multispectral images 10 that occurs when the same object is visible in multiple multispectral images 10 but appears in slightly different places in the image planes. FIG. 4 shows a comparison between the results of prior art pan sharpening methods and method 100 of the present invention. The multispectral images 10 displaying the yellow-green-blue band combination were taken over New York City on Dec. 18, 2009 by the WorldView-2 satellite. FIG. 4(A) shows pan sharpening according to prior art methods. Color smearing around vehicle 116 in red and green (as highlighted by arrow 122) is visible in portion 12 of pan sharpened image 15. In contrast, FIG. 4(B) shows pan sharpening according to an embodiment of method 100 in which color smearing around vehicle 116 (as highlighted by arrow 124) has been greatly reduced as shown in portion 12 of master fusion file 144. FIG. 4(A) shows color striping just off pedestrian bridge 118 (highlighted by arrow 126); in FIG. 4(B), however, the color striping off pedestrian bridge 118 is eliminated (highlighted by arrow 128) due to pan sharpening according to an embodiment of method 100. Similarly, in FIG. 4(A), some color striping can be observed in a shadow of building 120 (highlighted by arrow 130); in FIG. 4(B), however, the color striping in the shadow of building 120 is eliminated (as highlighted by arrow 132) due to pan sharpening according to an embodiment of method 100.

Embodiments of method 200 of the present invention address shortcomings in prior art methods that employ both forward and reverse transformation processes. For example, HIS pan sharpening model assumes that the panchromatic intensity is closely matched by a simple linear combination of the R, G and B multispectral bands, in which each multispectral component is given equal weight, as evidenced by the well-known calculation for determining intensity (I):

$$I = \frac{r + g + b}{3}$$ Equation 7

Figure 5:
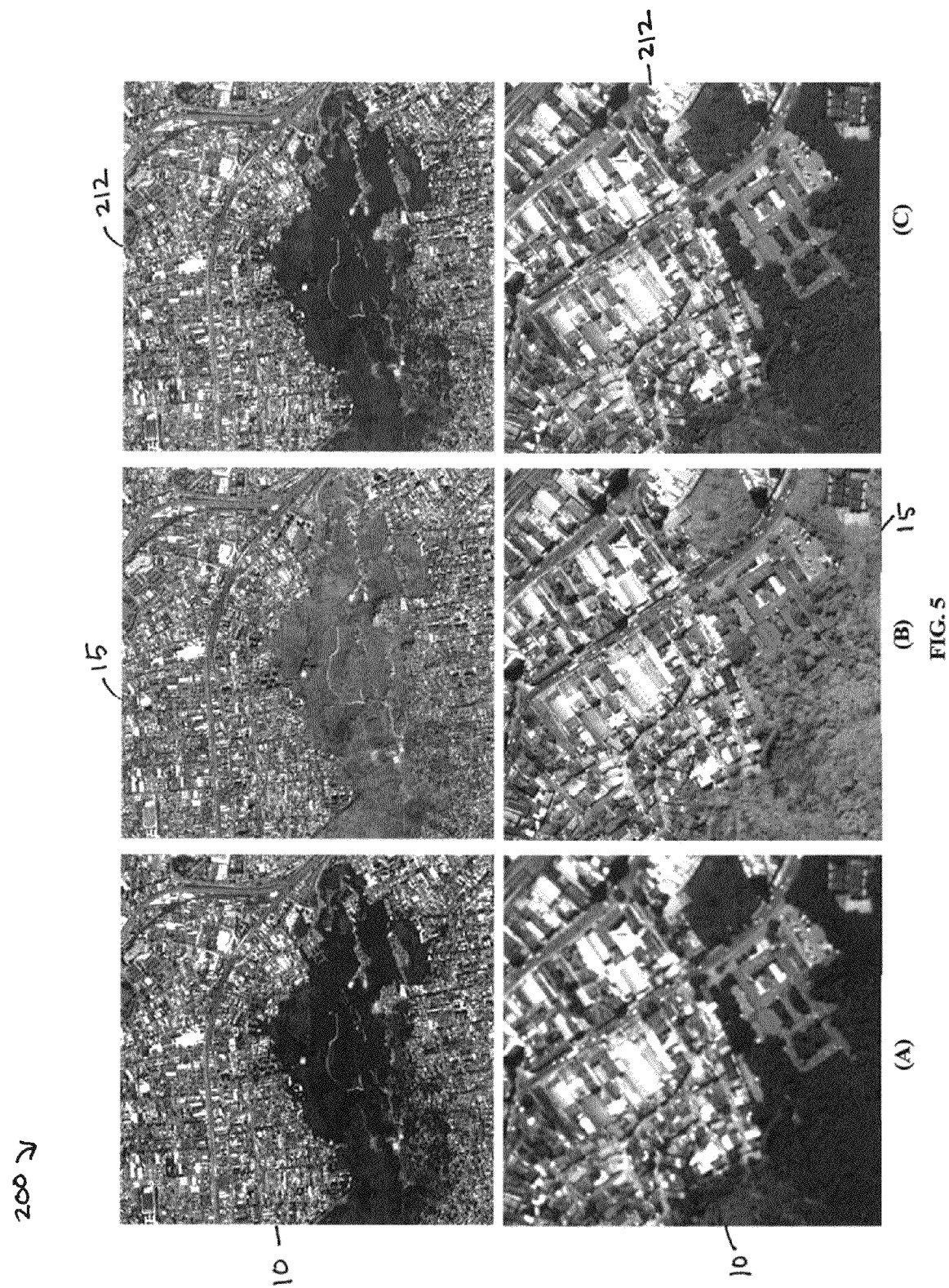
FIG. 5 shows examples of multispectral images pan sharpened according to (A) a prior art method; (B) an embodiment of the HIS-enhanced pan sharpening method of the present invention; and (C) an embodiment of the HIS-DMT pan sharpening method of the present invention.

However, this assumption may be fundamentally untrue for many remote sensing optical platforms. In addition, the spectral bandwidth of the panchromatic band may be much larger than the combined spectral bandwidths of the visible R, G and B bands, leading to color distortions in pan sharpened image 15. Reflectance of healthy, non-senescent vegetation in wavelengths longer than 700 nm is higher than the reflectance in the R, G, or B bands due to the presence of chlorophyll. Since there is an abundance of radiometric energy present in the panchromatic band that is not present the R, G, or B bands, color distortions from using HIS pan sharpening methods are most noticeable over vegetated areas, but can also be observed over all types of scene content, as well, as shown in FIG. 5(B). Thus, method 200 minimizes and, in some embodiments, virtually eliminates color distortions by perturbing the multispectral intensity component as little as possible while still maintaining the high spatial resolution of the p band. Embodiments of method 200 comprise HIS-enhanced pan sharpening method 201, HIS-difference modulation technique (DMT) pan sharpening method 202, 202' and DMT pan sharpening method 203.

In one embodiment for pan sharpening multispectral image 10 of a location (e.g., geographic location), method 201 (which may be referred to as HIS-enhanced pan sharpening) comprises providing panchromatic image 14 of the same location, or one in which the location is overlapping. Multispectral image 10 is upsampled to the same spatial resolution as panchromatic image 14. A forward transform of each of red r, green g, and blue b components for a pixel of the multispectral image 10 is performed to obtain hue, intensity and saturation bands. The process for performing the forward transform is well-known and, therefore, is not repeated here or elsewhere in describing the various embodiments of methods 100, 200, 300 of the present invention. Since the intensity band (I) has a certain level of spatial detail, the p band is smoothed to produce a smoothed p band comprising substantially the same level of spatial detail of the intensity band. Smoothing of method 201 of the present invention comprises removing high spatial frequency details from the p band, and may be accomplished by a sliding window convolution filter, performed with a square window, in which the value of the middle output pixel is the mean of all pixels. Other filters, such as a Fast Fourier Transform (FFT) filter or other filters, may also be used.

In an alternative embodiment, method 201 may further comprise an optional statistically matching step in which the distributions of the p band and smoothed p band are matched to distributions of the intensity band. This may be done through histogram matching or other methods of statistical matching, including computing a mean and a standard deviation of the p band, computing a mean and a standard deviation of the intensity band and modifying the p band and the smoothed p band to match the mean and standard deviation of the intensity band.

The intensity band is then modified by a ratio of the p band and the smoothed p band, denoted as $P_{smooth}$ to produce a modified intensity band as given by the following equation for modified intensity, denoted as I':

$$I' = \frac{p}{P_{smooth} + \epsilon} I \qquad \text{Equation 8}$$

where $\epsilon$ is a small number to prevent division by zero.

Method 201 further comprises performing a reverse transform, including obtaining a modified red component r', a modified green component g' and a modified blue component b' using the modified intensity band I', as given by the following equation:

$$r' = 3rI$$

$$g' = 3gI$$

$$b' = 3bI \qquad \text{Equation 9}$$

Figure 6:
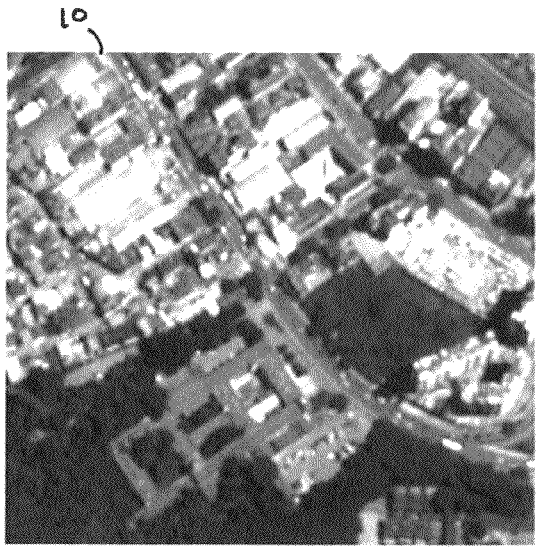
FIG. 6 shows examples of various multispectral images: (A) unsharpened; (B) pan sharpened according to a prior art method; (C) pan sharpened according to an embodiment of the HIS-DMT pan sharpening method of the present invention where $\beta=1.0$; and (D) pan sharpened according to an embodiment of the HIS-enhanced pan sharpening method of the present invention.
Figure 6:
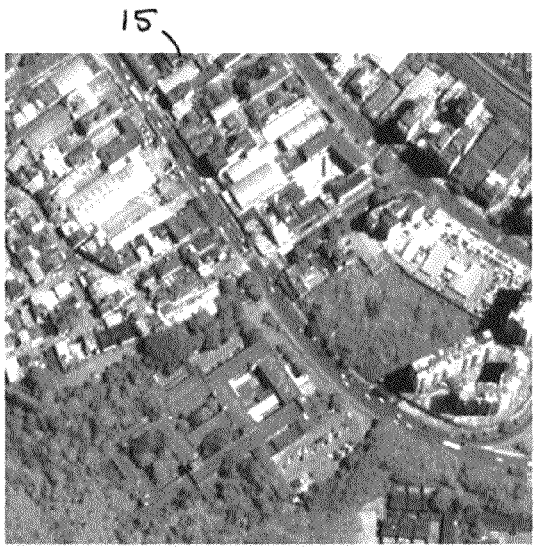
Figure 6:
Figure 6:

The process for performing the reverse transform is well-known and, therefore, is not repeated here or elsewhere in describing the various embodiments of methods 100, 200, 300 of the present invention. Multispectral image 10 is then changed back to the original color space as the modified red, green and blue components are used to sharpen the multispectral image 10, producing HIS-enhanced pan sharpened image 210, as can be seen in FIG. 6(D).

In yet another embodiment of method 200 for pan sharpening multispectral image 10 of a location (e.g., geographic location), a difference modulation technique (DMT) is employed to achieve both high color quality and spatial quality in the final HIS-DMT pan sharpened image 212. Method 202 (which may be referred to as HIS-DMT pan sharpening) comprises providing panchromatic image 14 of the same location, or one in which the location is overlapping. Multispectral image 10 is upsampled to the same spatial resolution as panchromatic image 14. A forward transform of each of red r, green g and blue b components for pixels of multispectral image 10 is performed to obtain hue, intensity and saturation bands. Since the intensity band (I) has a certain level of spatial detail, the p band is smoothed to produce a smoothed p band comprising substantially the same level of spatial detail of the intensity band. Smoothing of method 202 of the present invention comprises removing high spatial frequency details from the p band, which, in one embodiment, was accomplished by a sliding window convolution filter, with a square window, although other filtering methods, such as FFT filtering are also possible.

In an alternative embodiment, method 202 may further comprise an optional statistically matching step in which the distributions of the p band and smoothed p band are matched to distributions of the intensity band. This may be done through histogram matching or other methods of statistical matching such as have been previously described.

The intensity band is then modified by a difference between the p band and the smoothed p band $P_{smooth}$, thus modulating the original intensity band I to produce a modified intensity band I' as given by the following equation:

$$I' = 1 + \beta(p - p_{smooth}) \qquad \text{Equation 10}$$

$$I' = \begin{cases} 0 & \text{if } I' < 0 \\ I' & \text{if } I' > 0 \end{cases}$$

The quantity $\beta$ comprises a user-specified sharpening factor and may be set to any value equal to or greater than zero. Where $\beta$ equals zero, then the original intensity is not modulated at all and no sharpening is performed. Where $\beta$ is greater than zero, the original intensity I is modulated by the difference between the p band and the smoothed p band $P_{smooth}$ to arrive at I'.

Method 202 further comprises obtaining a modified red component r', a modified green component g' and a modified blue component b' using the modified intensity band I' in Equation 9 above. Multispectral image 10 is then changed back to the original color space as the modified red, green and blue components are used to sharpen the multispectral image 10, producing HIS-DMT pan sharpened image 212, as can be seen in FIGS. 5(C), 6(D), 7 and 10(C).

Figure 7:
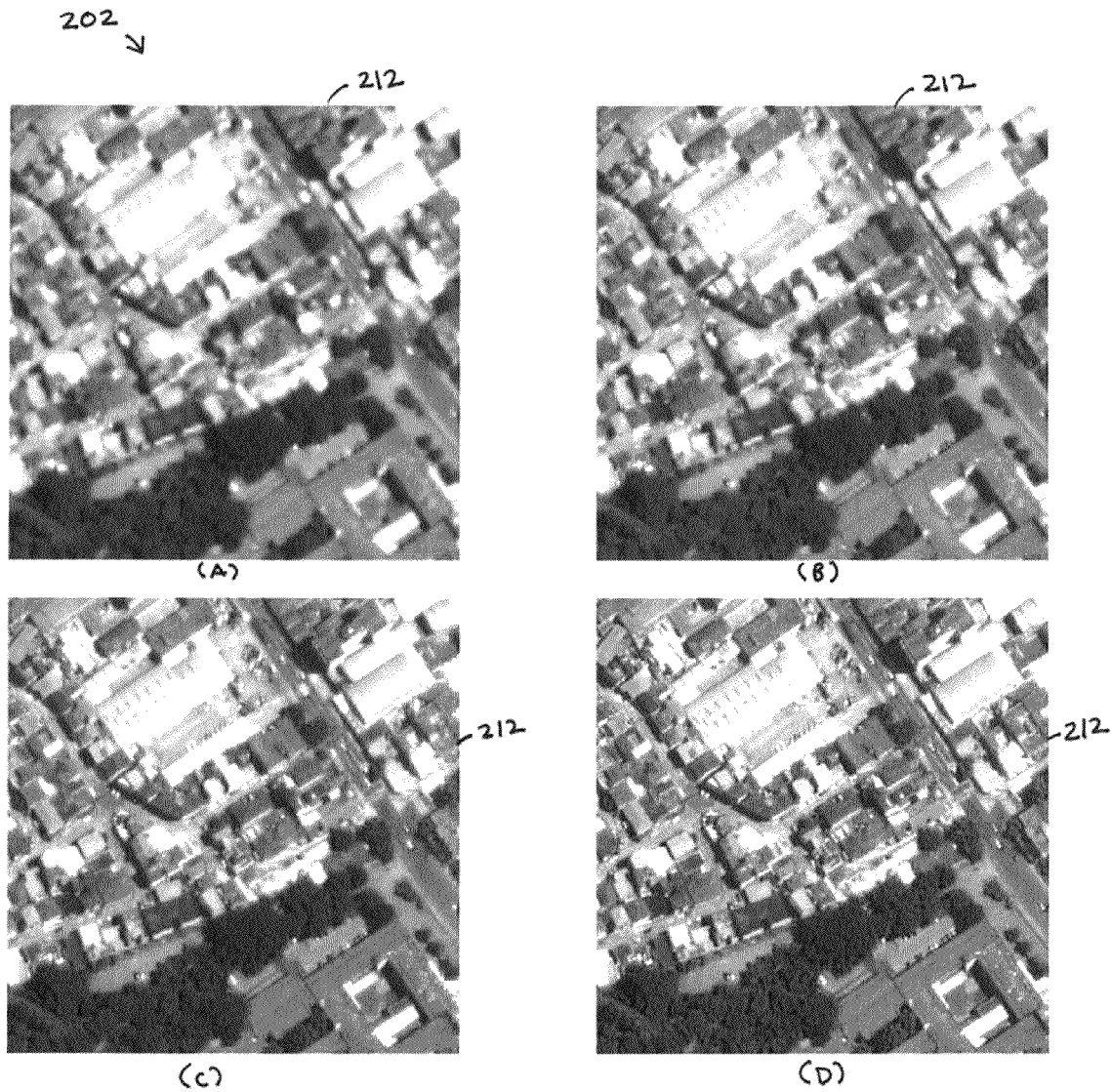
FIG. 7 shows examples of various multispectral images pan sharpened according to embodiments of the HIS-DMT pan sharpening method of the present invention in which sharpening factor (A) $\beta=0.25$; (B) $\beta=0.50$; (C) $\beta=0.75$; and (D) $\beta=1.0$.

Since $\beta$ is a user-specified sharpening factor, $\beta$ could be determined to be any value greater than zero, depending on the level of sharpening desired. If more sharpened is desired as opposed to less sharpening, the sharpening factor $\beta$ can be raised. In embodiments of method 200 of the present invention, β may be in a range from between zero and 2.0. If β equals zero, no sharpening will occur. In embodiments where β equals 1.0, then the original intensity I is modulated by the full difference between the p band and the smoothed p band and the resulting image will appear nearly as sharp as in panchromatic image 14. FIG. 7 shows embodiments of method 202 in which β was set to values from 0.25 to 1.0 (FIG. 7(A): β=0.25; FIG. 7(B): β=0.50; FIG. 7(C): β=0.75; FIG. 7(D): β=1.0). As illustrated in FIG. 7, as the value of β increases, HIS-DMT pan sharpened image 212 becomes noticeably sharper. In yet other embodiments where β is greater than 1, the sharpening effect is amplified; however, some color distortion may occur. In embodiments in which β was set to a value above 2.0, over-sharpened images were produced. By adjusting the value of sharpening factor β, the user may adjust the degree of pan sharpening on the fly in real time on either the entire multispectral image 10 or portion 12 of it.

In an alternative embodiment of method 202', as is explained in greater detail below, instead of smoothing, a synthetic p band can be generated from all the N bands of multispectral image 10 (e.g., as shown in Equation 12). Method 202' may further comprise matching an intensity of the synthetic p band to an intensity of the p band, using a coefficient for each of N spectral bands where each of the coefficients is based on a spectral overlap between the p band and each of the spectral bands, resulting in an intensity matched synthetic p band (e.g., as shown in Equations 12 and 13). An adjusted intensity may be calculated by multiplying sharpening factor β by the difference between the p band and the intensity matched synthetic p band (e.g., as shown in Equation 14).

In yet another embodiment for pan sharpening multispectral image 10 of a geographic location, method 200 may comprise another DMT pan sharpening technique. In the present embodiment, method 203 comprises using the synthetic p band to obtain DMT pan sharpened image 213, as more fully described below.

For pan sharpening multispectral image 10 (having N spectral bands), method 203 comprises providing panchromatic image 14 of the location (e.g., geographic location). A forward transform of each of red r, green g and blue b components for pixels of multispectral image 10 is performed to obtain hue, intensity and saturation bands, the intensity band (I) having a certain level of spatial detail.

Method 203 further comprises generating synthetic p band from the N spectral bands using a coefficient as given in the following equation:

$$Pan_{synthetic} = \sum_{i=1}^{N} C_i \times MS_i \qquad \text{Equation 11}$$

where $MS_i$ denotes the i'th multispectral band, and the coefficients $C_i$ are the weights given to each multispectral component.

Figure 8:
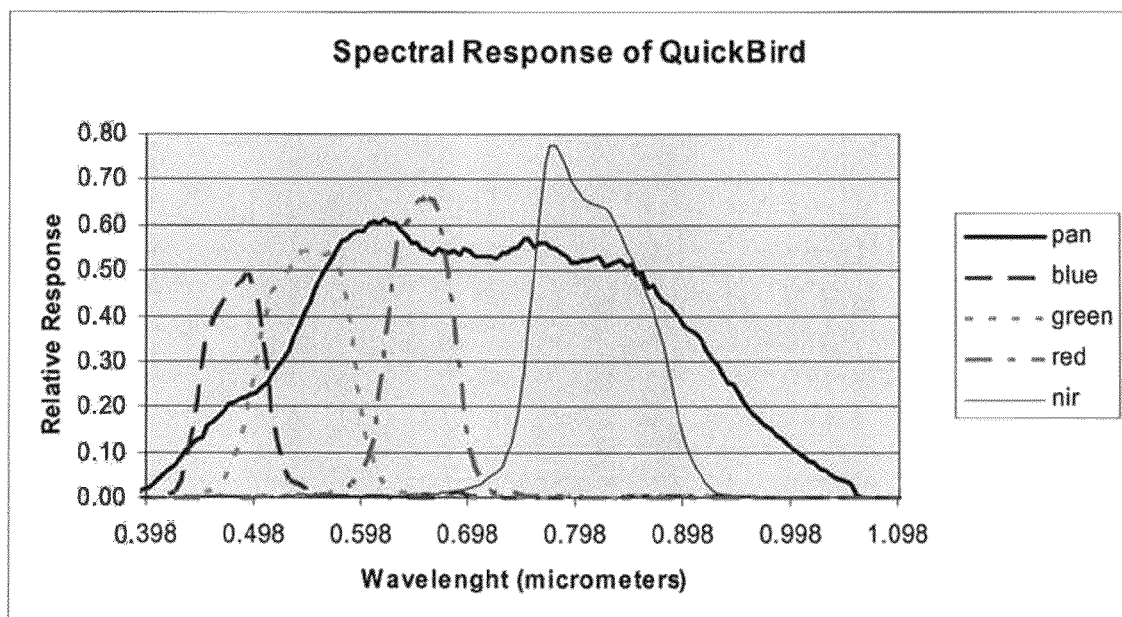
FIG. 8 is a graph of the relative spectral response for various spectral bands of the QuickBird satellite.

The coefficients $C_i$ may be determined by calculating the spectral overlap between the given MS band and the p band using the data from the curves shown in FIG. 8 as follows:

$$C_i = \frac{K_i \times \int \text{Min}(P_{spectral\_response}, MS_{i,spectral\_response})}{K_P} \qquad \text{Equation 12}$$

where $K_i$ is the factor for the i'th MS band which converts digital numbers to units of radiance (in watts per steradian per meter squared $W \cdot sr^{-1} \cdot m^{-2}$); $K_P$ is the factor for the p band which converts digital numbers to units of radiance; $P_{spectral\_response}$ is the measured spectral response of the p band; $MS_{i,spectral\_response}$ is the measured spectral response of the i'th MS band; and $\text{Min}(P_{spectral\_response}, MS_{i,spectral\_response})$ represents the minimum value of either argument, such that the integral is carried out to determine the minimum amount of spectral overlap between the i'th MS band and the p band.

Method 203 further comprises matching an intensity of the p band with an intensity of the synthetic p band, producing an intensity matched synthetic p band. It may be desirable to produce an intensity matched synthetic p band given that the model used to generate the synthetic p band may contain errors. In addition, since the bandwidth of the p band may be significantly wider than the combined bandwidths of the N spectral bands of multispectral image 10, the intensities may differ significantly between the p band and the synthetic p band. The intensity of synthetic p band is matched to that of the p band using a linear-gain offset correction as follows:

$$Pan = \qquad \text{Equation 13}$$
$$\text{gain} \times Pan_{synthetic} + \text{offset} = \text{gain} \times \left[\sum_{i=1}^{N} C_i \times MS_i\right] + \text{offset}$$

$$I' = \begin{Bmatrix} 0 \text{ if } I' < 0 \\ I' \text{ if } I' > 0 \end{Bmatrix}$$

where Pan is the p band, $Pan_{synthetic}$ is the synthetic p band, gain is the linear multiplier, and offset is the bias correction. The gain and offset terms above are determined by gathering spatially coincident pixels from both the p band and the synthetic p band and fitting them via a linear least squares fit, according to methods well-known in the art.

As in the case of other embodiments of method 200, method 203 comprises determining a modified intensity band I', in this case, modulating original intensity band I based on a difference between the p band and the intensity matched synthetic p band modified by sharpening factor β, as follows:

$$I'=1+\beta(Pan-(\text{gain} \times Pan_{synthetic}+\text{offset})) \qquad \text{Equation 14}$$

Gain, offset and sharpening factor β have been described previously. As in the case of method 202, 202' β may be in a range from between zero and 2.0. In embodiments where β equals 1.0, then the original intensity I would be modulated by the full difference between the p band and the synthetic p band and the resulting image would appear nearly as sharp as in panchromatic image 14. As the value of β increases, DMT pan sharpened image 213 would become noticeably sharper. In yet other embodiments where β is greater than 1, the sharpening effect is amplified; however, some color distortion may occur. If β were set to a value above 2.0, over-sharpened images would be produced. By adjusting the value of sharpening factor β, the user may adjust the degree of pan sharpening on the fly in real time on either the entire multispectral image 10 or a portion 12 of it.

Method 203 further comprises obtaining a modified red component r', a modified green component g' and a modified blue component b' using the modified intensity band I' in Equation 14 above. Multispectral image 10 is then changed back to the original color space as the modified red, green and blue components are used to sharpen the multispectral image 10, producing DMT pan sharpened image 213, as can be seen in FIG. 9.

Figure 9:
FIG. 9 shows examples of multispectral images pan sharpened according to (A) a prior art method; (B) an embodiment of the DMT pan sharpening method of the present invention.

FIG. 9 shows an image of Longmont, Colo. as taken by the QuickBird satellite owned and operated by DigitalGlobe, Inc. The word THANK YOU is spelled out on the ground by DigitalGlobe employees. In FIG. 9(A), in which pan sharpened image 15 was pan sharpened using prior art HIS methods, color distortions are quite evident. In contrast, the DMT pan sharpened image 213 provides excellent color balance and sharpness achieved by an embodiment of method 203 of the present invention.

As would be apparent to one of ordinary skill in the art after becoming familiar with the teachings of the present invention, the embodiments of method 200 that have been specifically described herein could be easily adapted to pan sharpening methods that are similar to HIS pan sharpening, such as Hue Light Saturation (HLS) and Hue Value Saturation (HVS). Generally, the difference between such methods is the mathematical definition of intensity, light and value. The hue and saturation components of all of the foregoing methods are generally the same.

The present invention also includes embodiments of method 300, which is directed to a method of in-place pan sharpening that avoids explicit forward and reverse transformation steps to and from a different color space. Since the algorithms of method 300 are simpler than methods involving forward and reverse transformation steps, method 300 provides decided advantages in improved image processing without sacrificing image quality. In addition, since embodiments of method 300 are vector-based, all multispectral bands can be sharpened, not just with reference to red, green and blue components, as in other methods.

Since method 300 skips the forward transformation step of other pan sharpening methods, in favor of a vector transformation based on vector length, method 300 may begin with upsampling multispectral image 10. Method 300 further comprises determining a vector associated with an index of pixels in multispectral image 10, as follows:

$$\vec{x}' = [x_1', x_2', \ldots, x_N']$$ Equation 15 where each component $x_i$, of vector x, represents a pixel in upsampled multispectral image 10, and the pixel index i runs from 1 to N.

Method 300 further comprises determining intensity I by determining the L2 norm, or length, of vector x, as follows:

$$I = \sqrt{\sum_{i=1}^{N} x_i^2}$$ Equation 16

A ratio $R_i$ of $x_i$, the i-th component of vector x, to intensity I may be determined, as follows:

$$R_i = \frac{x_i}{I + \epsilon}$$ Equation 17 where $\epsilon$ is a small number to prevent division by zero. There can be N such ratios. The original color component $x_i$ is recovered when $R_i$ is multiplied by I as follows:

$$x_i = R_i I$$ Equation 18

In specific embodiments described herein, method 300 comprises method 301 for direct substitution in-place pan sharpening, method 302 for enhanced substitution in-place pan sharpening and method 303 for DMT in-place pan sharpening. Embodiments of method 301 will now be described.

After upsampling multispectral image 10, method 301 comprises determining vector x' associated with the pixel index i for multispectral image 10, as has been previously described in connection with Equation 15, which is incorporated here. As set forth above, I may be determined with reference to Equation 16 and $R_i$ may be determined with reference to Equation 17, as has been previously explained, and which equations are incorporated here.

Panchromatic image 14 of the same or overlapping geographic location as multispectral image 10 is provided as part of method 301. In an alternative embodiment, method 301 may comprise matching a histogram of the p band with a histogram of the I band, as follows:

$$p = \text{HISTOGRAMMATCH}(I)$$ Equation 19

Histogram matching is not required, however. Other types of statistical matching could be used as well, but this is not required either. If histogram or statistical matching is not desired, then the p band can be used unaltered.

Method 301 further comprises sharpening by determining adjusted component $x_i'$ using component $x_i$ by one of multiplying the ratio by the p band (or multiplying the component $x_i$ by a ratio of the p band to the intensity), as follows:

$$x_i' = R_i p = x_i \frac{p}{I + \epsilon}$$ Equation 20 where $\epsilon$ is a small number to prevent division by zero. Equation 20 is applied to compute adjusted component $x_i'$ for all N components of the original N multispectral bands. All adjusted components $x_i'$ are assembled into adjusted vector x', thereby sharpening each pixel to produce direct substitution in-place pan sharpened image 311, as shown in FIG. 10(A).

In another embodiment, method 300 comprises method 302 for enhanced substitution in-place pan sharpening. While method 301 may be more effective than prior art methods for pan sharpening, method 302 may be still more advantageous since method 302 generally performs better in replicating the original colors of multispectral image 10 with better spatial recovery than method 301.

After upsampling multispectral image 10 and providing panchromatic image 14, method 302 comprises smoothing the p band of panchromatic image 14, as follows:

$$p_{smooth} = \text{SMOOTH}(p)$$ Equation 21

In one embodiment, smoothing the p band to produce a smoothed p band comprises using a sliding window convolution filter, with a square window, in which the value of the middle output pixel is the mean of all pixels in the window. Other filtering methods, such as FFT filtering, are also possible.

In an alternative embodiment, method 302 may comprise statistical matching of the distributions of the p band and the smoothed p band to distributions of the I band through calculation of the mean and standard deviation, as has been previously described, or through histogram matching. Neither statistical matching nor histogram matching are required, however.

Method 302 further comprises sharpening by determining adjusted component $x_i'$ using component $x_i$ by multiplying the component $x_i$ of vector x by a ratio of the p band to the smoothed p band, as follows:

$$x'_i = x_i \frac{p}{p_{smooth} + \varepsilon} \quad \text{Equation 22}$$

where $\varepsilon$ is a small number to prevent division by zero. Equation 22 is an alternative way of expressing $R_i \cdot p$. Equation 22 is applied to compute adjusted component $x_i'$ for all N components of the original N multispectral bands. All adjusted components $x_i'$ are assembled into adjusted vector x', thereby sharpening each pixel to produce enhanced substitution in-place pan sharpened image 312, as shown in FIG. 10(B).

An embodiment of method 303 for DMT in-place pan sharpening will now be described. After upsampling multispectral image 10, method 303 comprises determining vector x' associated with the pixel index i for multispectral image 10, as has been previously explained with reference to Equation 15, which is incorporated here. I may be determined with reference to Equation 16 and $R_i$ may be determined with reference to Equation 17, as has been previously explained, and which are incorporated here.

Panchromatic image 14 of the same or overlapping location (e.g., geographic location) as multispectral image 10 is provided as part of method 303. Method 303 comprises smoothing the p band of panchromatic image 14 with reference to Equation 21, which is incorporated here. In one embodiment, smoothing the p band to produce a smoothed p band comprises using a sliding window convolution filter, with a square window, in which the value of the middle output pixel is the mean of all pixels in the window. Other filtering methods, such as FFT filtering, are also possible.

In an alternative embodiment, method 303 may comprise statistical matching of the distributions of the p band and the smoothed p band to distributions of the I band through calculation of the mean and standard deviation, as has been previously described, or through histogram matching with reference to Equation 19, or other types of statistical matching. Neither statistical matching nor histogram matching is required, however.

Method 303 further comprises modulating each of the color components $x_i$ by determining adjusted component $x_i'$ by the difference between the p band and the smoothed p band, as follows:

$$x_i' = x_i + \beta(p - p_{smooth}) \quad \text{Equation 23}$$

$$x_i' = \begin{cases} 0 & \text{if } x_i' < 0 \\ x_i' & \text{if } x_i' > 0 \end{cases}$$

Sharpening factor $\beta$ has been previously described. As in the case of method 202, 202', 203, $\beta$ may be in a range from between zero and 2.0. In embodiments where $\beta$ equals 1.0, then the original intensity I would be modulated by the full difference between the p band and the synthetic p band and the resulting image would appear nearly as sharp as in panchromatic image 14. As the value of $\beta$ increases, DMT in-place pan sharpened image 313 would become noticeably sharper. In yet other embodiments where $\beta$ is greater than 1, the sharpening effect is amplified; however, some color distortion may occur. If $\beta$ were set to a value above 2.0, over-sharpened images would be produced. By adjusting the value of sharpening factor $\beta$, the user may adjust the degree of pan sharpening on the fly in real time on either the entire multispectral image 10 or a portion 12 of it.

Equation 23 is applied to compute adjusted component $x_i'$ for all N components of the original N multispectral bands. All adjusted components $x_i'$ are assembled into adjusted vector x', thereby sharpening each pixel to produce DMT in-place pan sharpened image 313, as shown in FIG. 10(D).

Figure 10:
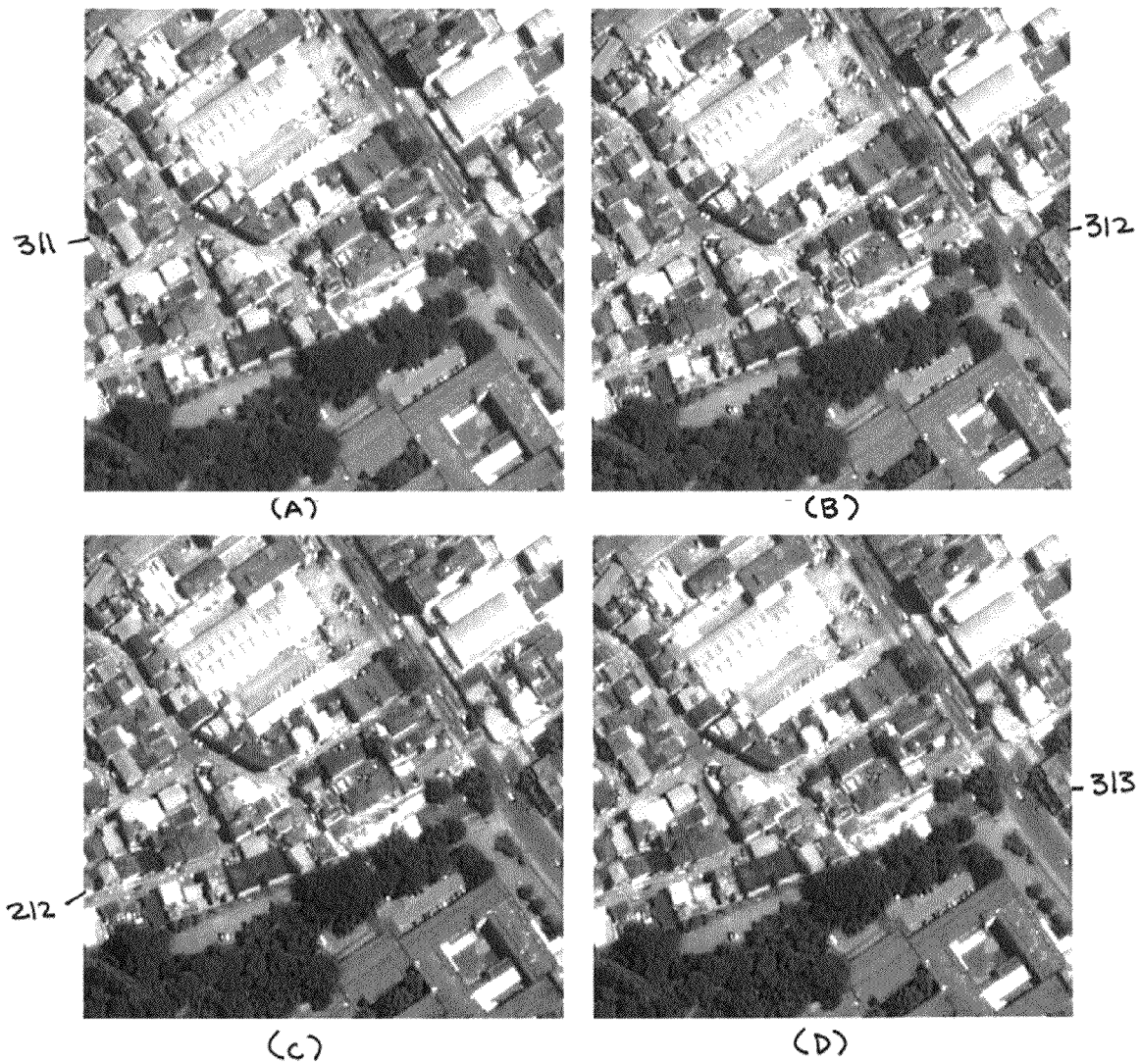
FIG. 10 shows examples of multispectral images pan sharpened according to embodiments of a method of the present invention for: (A) direct substitution in-place pan sharpening; (B) enhance substitution in-place pan sharpening; (C) HIS-DMT pan sharpening; and (D) DMT in-place pan sharpening.

FIG. 10 shows the effect of the various embodiments of method 300 by comparing direct substitution in-place pan sharpened image 311, enhanced substitution in-place pan sharpened image 312 and DMT in-place pan sharpened image 313. HIS-DMT pan sharpened image 212 is also shown.

The various methods 100, 200, 300 of the present invention may be implemented using various image processing equipment and systems, including electronics, circuitry and special purpose processors for processing of remotely-sensed imagery, such as multispectral image 10 and panchromatic image 14. In one embodiment, a computer readable medium operatively associated with the image processing system of the present invention may be programmed with instructions that, when executed by one or more processors, cause the image processing system to automatically carry out the steps of any or all of methods 100, 200, 300 for pan sharpening multispectral image 10. The program instructions are stored in the computer readable medium. Multispectral image 10 and panchromatic image 14 may be stored, as well, saved to files in the image processing system. The various pan sharpened images 140, 141, 142, 210, 212, 213, 311, 312, 313 produced by methods 100, 200, 300 of the present invention may also be saved to output files; data generated from intermediate steps in methods 100, 200, 300 may also be saved to appropriate files, as would be familiar to one of ordinary skill in the art.

Figure 11:
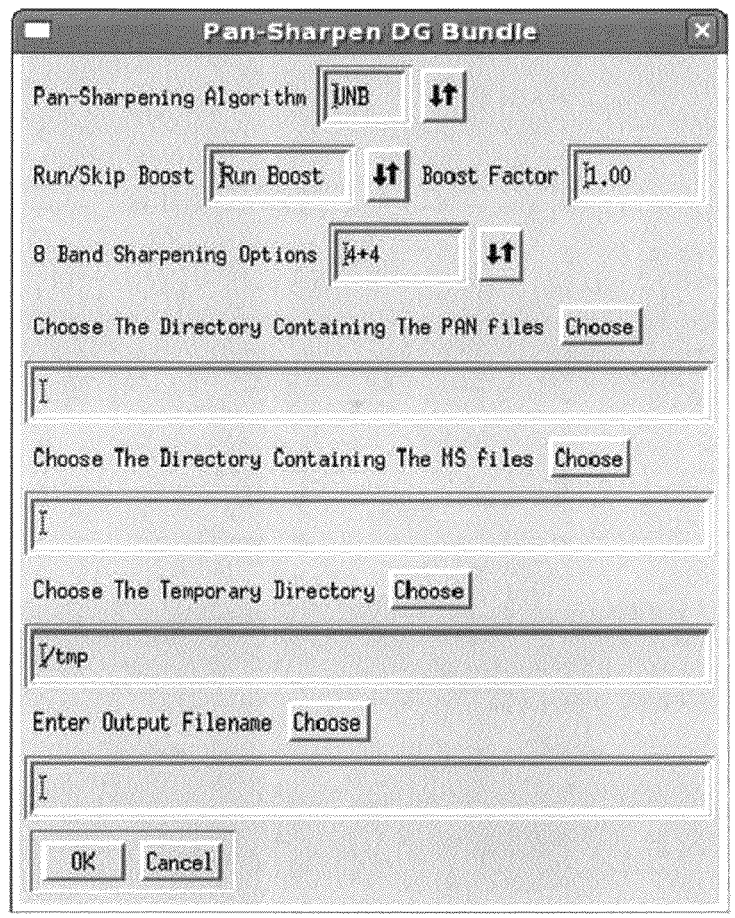
FIG. 11 shows a graphic user interface used in conjunction with an embodiment of a method for pan sharpening according to the present invention.

In one embodiment, the user executes the instructions with which the computer readable medium associated with a high performance computing system is programmed by selecting a command line tool for the desired pan sharpening method 100, 200, 300. For example, a graphic user interface (GUI) for use in conjunction with method 100 is shown in FIG. 11. See also FIG. 9 with reference to an embodiment of method 203. As shown in FIG. 11, the user selects the pan sharpening method 100, which in this example is denoted by UNB. The GUI also contains a pre-sharpening option denoted by boost and associated boost factor. The option for sharpening 8 spectral bands according to an embodiment of method 100 is invoked by selecting the "4+4" option. Other GUI options permit the user to select: a directory containing panchromatic image files, a directory containing the multispectral files, a temporary directory, and an output file name.

As would be apparent to one of ordinary skill in the art after becoming familiar with the teachings of the present invention, in another embodiment of the image processing system of the present invention, provision could be made for additional user input through the GUI or use of more general purpose processors equipped with software embedded with special instructions to follow various steps of any or all of methods 100, 200, 300 of the present invention.

Embodiments of method 200 and 300 were tested as explained in more detail below. While there appears to be no agreement in the literature about how to quantitatively evaluate performance of a pan sharpening method, one quality index is the Wang-Bovic quality index described in Wang Z., Bovic, A., "A Universal Image Quality Index," IEEE Signal Processing Letters, Vol. 9, No. 3 (March 2002), which is incorporated here for all that it teaches. The utility of the Wang-Bovic quality index for evaluating pan sharpening performance has been demonstrated in Borel, C., Spencer, C. Ewald, K., Wamsley C., "Novel methods for panchromatic sharpening of multi/hyper-spectral image data," SPIE conference paper (Jul. 22, 2009). The Wang-Bovic quality index for two images f and g is defined as:

$$Q_{WB} = \frac{\sigma_{fg}}{\sigma_f \sigma_y} \frac{2\mu_f \mu_g}{\mu_f + \mu_y} \frac{2\sigma_f \sigma_g}{(\mu_f^2 + \mu_g^2)(\sigma_f + \sigma_g)}$$
Equation 24 where the variances are represented as $\sigma_f$ and $\sigma_g$ and the means are represented as $\mu_f$ and $\mu_g$. Following Wang-Bovic, the first term is the spatial cross correlation between f and g, the second term is a comparison of the means between f and g, and the third term is a comparison of the contrasts. The index goes between −1 and 1. When the image f is considered to be the original, unaltered image, and the image g is considered to be the altered image, then $Q_{WB}$ is considered to measure the quality of g with respect to f.

The Wang-Bovic quality index requires a reference image; however, in pan sharpening methods, no reference image exists at the pan sharpened resolution. Rather, the pan sharpened image must be downsampled to the original multispectral resolution, which allows direct computation of the quality index. The $Q_{WB}$ can be computed at a certain scale, or block size. A block size of approximately ¼ of the image can be used, according to Borel.

The Wang-Bovic quality index can be computed for each band in the original multi-spectral image, producing a vector of values. The quantity $Q_\lambda$ can be defined as follows:

$$Q_\lambda = [Q_{WB}(MS_1, PS_1), Q_{WB}(MS_2, PS_2), \ldots, Q_{WB}(MS_N, PS_N)]$$
Equation 25 where MS indicates the original multispectral band in the image, and PS indicates the pan sharpened band (downsampled to the multispectral resolution), and N is the number of bands in the image.

The computation of $Q_{WB}$ alone is unsatisfactory to fully evaluate pan sharpening quality. Since the computation is carried out at the same spatial resolution as the multispectral image, the $Q_{WB}$ index cannot evaluate the spatial quality of the image at the panchromatic resolution. For evaluating the spatial performance of a pan sharpening algorithm, simply computing the cross-correlation of the original pan band with each band of the pan sharpened image provides an effective measure of spatial quality. The cross-correlation of two signals A and B is defined as:

$$CC(A, B) = \frac{\sum (A_i - \mu_A)(B_i - \mu_B)}{\sqrt{\sum (A_i - \mu_A)^2 \sum (B_i - \mu_B)^2}}$$
Equation 26 where $\mu_A$ and $\mu_B$ are the means of signals A and B, and the summation runs over all elements of each signal. The CC metric goes from −1 to 1. The cross-correlation can be computed between the pan band and every band in the pan sharpened image producing a vector of values. We define the quantity $C_\lambda$ as:

$$CC_\lambda = [CC(Pan, PS_1), CC(Pan, PS_2), \ldots, CC(Pan, PS_N)]$$
Equation 27 where Pan indicates the panchromatic band, and PS indicates the pan sharpened band, with the subscript indicating the band index, and N is the number of bands in the image. Both the spectral and spatial quality measures defined above are computed using a moving window approach, which is well known.

The spectral and spatial quality for each band can be averaged as follows to produce spectral and spatial quality indicators for all bands:

$$Q_{spectral} = \frac{1}{N} \sum_{\lambda=1}^{N} Q_\lambda$$
Equation 28

$$Q_{spatial} = \frac{1}{N} \sum_{\lambda=1}^{N} CC_\lambda$$
Equation 29

Table 1 compares spatial and spectral quality measurements for HIS direct pan sharpening method of the prior art, HIS-DMT pan sharpening method 202, and HIS-enhanced pan sharpening method 201 are presented. Both the HIS-DMT pan sharpening method 202 and the HIS enhanced pan sharpening method 201 greatly improved the spectral quality of multispectral image 10, at the cost of a small loss in spatial quality, compared to the HIS direct pan sharpening method.

TABLE 1

| Pan sharpening Method | Spectral | | | Average Spectral | Spatial | | | Average Spatial |
|---|---|---|---|---|---|---|---|---|
| | Red | Green | Blue | | Red | Green | Blue | |
| HIS-Direct | 0.7054 | 0.8123 | 0.9071 | 0.8083 | 0.9871 | 0.9939 | 0.9503 | 0.9771 |
| HIS-DMT | 0.8647 | 0.9041 | 0.9371 | 0.9020 | 0.9261 | 0.9549 | 0.9178 | 0.9329 |
| HIS-Enhanced | 0.8667 | 0.9043 | 0.9357 | 0.9022 | 0.9258 | 0.9550 | 0.9194 | 0.9334 |

Table 2 shows spatial and spectral quality measurements for the HIS-DMT pan sharpening method 202, with different values of sharpening factor β. Spatial quality increases as values of sharpening factor β approach 1.

TABLE 2

| Pan sharpening Method | Spectral | | | Average Spectral | Spatial | | | Average Spatial |
|---|---|---|---|---|---|---|---|---|
| | Red | Green | Blue | | Red | Green | Blue | |
| HIS-DMT β = 0.25 | 0.957 | 0.957 | 0.960 | 0.958 | 0.876 | 0.912 | 0.875 | 0.888 |
| HIS-DMT β = 0.50 | 0.937 | 0.947 | 0.956 | 0.947 | 0.902 | 0.933 | 0.893 | 0.910 |

TABLE 2-continued

| Pan sharpening | Spectral | | | Average | Spatial | | | Average |
|---|---|---|---|---|---|---|---|---|
| Method | Red | Green | Blue | Spectral | Red | Green | Blue | Spatial |
| HIS-DMT β = 0.75 | 0.905 | 0.929 | 0.949 | 0.927 | 0.918 | 0.947 | 0.907 | 0.924 |
| HIS-DMT β = 1.0 | 0.865 | 0.904 | 0.937 | 0.902 | 0.926 | 0.955 | 0.918 | 0.933 |

Figure 12:
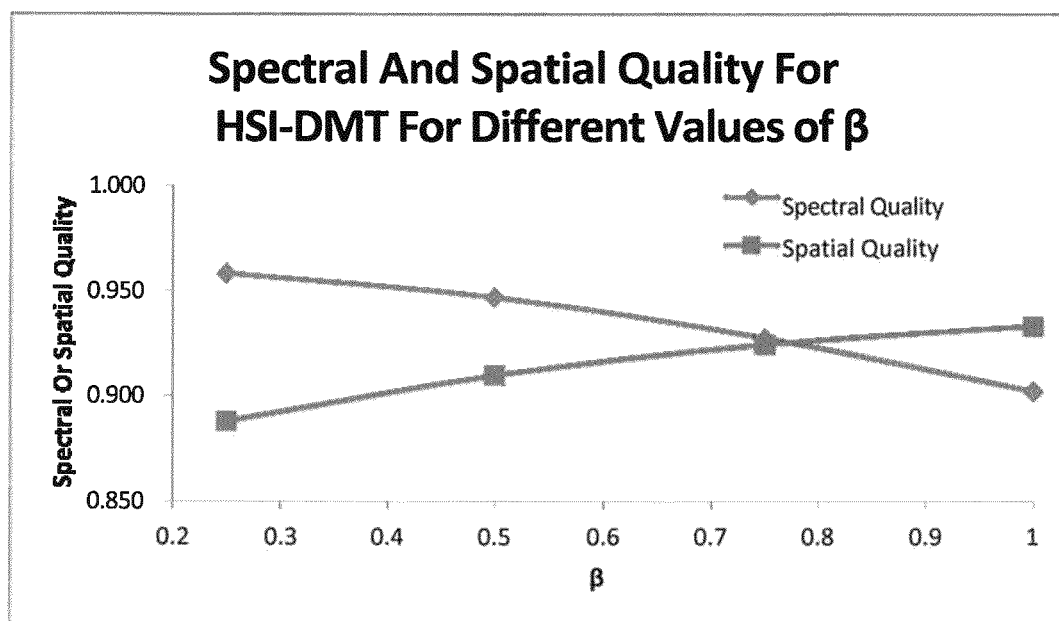
FIG. 12 is a graph of a comparison between spectral and spatial values for different values of sharpening factor $\beta$ in an embodiment of the HIS-DMT pan sharpening method of the present invention.

In addition, the tradeoff between spectral quality and spatial quality as the value of sharpening factor β increases can be seen in FIG. 12.

Table 3 shows spectral and spatial quality measurements for direct in-place pan sharpening method 301, enhanced in-place pan sharpening method 302 and DMT in-place pan sharpening method 303.

TABLE 3

| Pan sharpening | Spectral | | | | Average | Spatial | | | | Average |
|---|---|---|---|---|---|---|---|---|---|---|
| Method | Red | Green | Blue | Nir | Spectral | Red | Green | Blue | Nir | Spatial |
| In Place Direct | 0.577 | 0.578 | 0.587 | 0.519 | 0.565 | 0.944 | 0.965 | 0.917 | 0.614 | 0.860 |
| In Place Enhanced | 0.867 | 0.904 | 0.936 | 0.928 | 0.909 | 0.926 | 0.955 | 0.919 | 0.499 | 0.825 |
| In Place DMT β = 1.0 | 0.877 | 0.932 | 0.878 | 0.917 | 0.901 | 0.925 | 0.946 | 0.934 | 0.520 | 0.831 |

Table 4 shows spectral and spatial quality measurements for the DMT in-place pan sharpening method 303 for various values of sharpening factor β.

TABLE 4

| Pan sharpening | Spectral | | | | Average | Spatial | | | | Average |
|---|---|---|---|---|---|---|---|---|---|---|
| Method | Red | Green | Blue | Nir | Spectral | Red | Green | Blue | Nir | Spatial |
| In Place DMT β = 0.25 | 0.959 | 0.958 | 0.957 | 0.955 | 0.957 | 0.875 | 0.905 | 0.890 | 0.436 | 0.777 |
| In Place DMT β = 0.50 | 0.941 | 0.954 | 0.941 | 0.948 | 0.946 | 0.901 | 0.922 | 0.915 | 0.468 | 0.801 |
| In Place DMT β = 0.75 | 0.913 | 0.945 | 0.914 | 0.935 | 0.927 | 0.917 | 0.936 | 0.929 | 0.496 | 0.819 |
| In Place DMT β = 1.0 | 0.877 | 0.932 | 0.878 | 0.917 | 0.901 | 0.925 | 0.946 | 0.934 | 0.520 | 0.831 |

Having herein set forth the various embodiments of the present invention, it is anticipated that suitable modifications can be made thereto which will nonetheless remain within the scope of the invention. The invention shall therefore only be construed in accordance with the following claims:

What is claimed is:

1. A method for pan sharpening a first multispectral image of an area, comprising:
    providing at least a second multispectral image of the area, the first and second multispectral images comprising a synoptic pair and each multispectral image comprising multiple spectral bands of M band groups, where M is a number of band groups in a range of 1 to M;
    providing a panchromatic image of the geographical area, the panchromatic image comprising a p band;
    for each band group m in the range of 1 to M, with a computer:
        (a) upsampling band group m;
        (b) pan sharpening band group m using the p band;
        (c) producing a pan sharpened result for band group m; and
    continuing steps (a)-(c) to produce pan sharpened results for each band group from 1 to M; and
    fusing together the pan sharpened results for band groups 1 to M to produce a master fused image.

2. The method of claim 1, wherein the pan sharpening comprises:
    smoothing the p band to produce a smoothed p band;
    for each pixel, determining a vector x, the vector x having N spectral bands and comprising component xi where i is an index that runs from 1 to N;
    determining an intensity based on a length of the vector x;
    determining a ratio of each component xi to the intensity;
    determining an adjusted component xi' using component xi,
    using the adjusted component xi' to calculate an adjusted vector x' to pan sharpen each pixel to produce a sharpened multispectral image.

3. The method of claim 2, wherein determining an adjusted component xi' comprises using component xi, the p band and the smoothed p band.

4. The method of claim 2, wherein determining an adjusted component xi' comprises using component xi, the p band and the intensity.

5. The method of claim 1, wherein the pan sharpening comprises:
    performing a forward transform of each of red, green and blue components for a pixel of the multispectral image to obtain hue, intensity and saturation bands, the intensity band having a level of spatial detail;
    smoothing the p band to produce a smoothed p band comprising substantially the same level of spatial detail of the intensity band;
    modifying the intensity band by a ratio of the p band and the smoothed p band to produce a modified intensity band;
    obtaining a modified red component, a modified green component and a modified blue component using the modified intensity band; and
    using the modified red, green and blue components to sharpen the multispectral image.

6. The method of claim 1, wherein the band groups from 1 to M do not all have the same number of spectral bands.

7. The method of claim 1, wherein the synoptic pair of multispectral images comprises multispectral images collected in separate multispectral configurations.

8. A method of pan sharpening a multispectral image of a location, comprising;
providing a panchromatic image of the location, the panchromatic image having a p band;
with a computer, performing a forward transform of each of red, green and blue components for a pixel of the multispectral image to obtain hue, intensity and saturation bands, the intensity band having a level of spatial detail;
with a computer, smoothing the p band to produce a smoothed p band comprising substantially the same level of spatial detail of the intensity band;
with a computer, modifying the intensity band using the p band and the smoothed p band to produce a modified intensity band;
obtaining a modified red component, a modified green component and a modified blue component using the modified intensity band; and
using the modified red, green and blue components to sharpen the multispectral image, producing a pan sharpened multispectral image.

9. The method of claim 8, wherein the smoothing comprises removing high spatial frequency details from the p band.

10. The method of claim 8, wherein the method is performed without matching a histogram of the intensity band with a histogram of the p band.

11. The method of claim 8, wherein modifying the intensity band using the p band and the smoothed p band comprises modifying the intensity band by a ratio of the p band to the smoothed p band.

12. The method of claim 11, wherein the modifying the intensity band by a ratio of the p band to the smoothed p band comprises multiplying the ratio of the p band to the smoothed p band by the intensity band.

13. The method of claim 8, further comprising statistical matching by computing a mean and a standard deviation of the p band, computing a mean and a standard deviation of the intensity band and modifying the p band and the smoothed p band to match the mean and standard deviation of the intensity band.

14. The method of claim 8, wherein the modifying the intensity band using the p band and the smoothed p band comprises modifying the intensity band by a difference between the p band and the smoothed p band.

15. The method of claim 14, wherein the modifying by a difference between the p band and the smoothed p band comprises multiplying the difference between the p band and the smoothed band by a sharpening factor.

16. The method of claim 15, wherein the sharpening factor is in a range of above zero to 2.

17. The method of claim 16, wherein the sharpening factor is equal to about 1.

18. A method for pan sharpening a multispectral image of a location, the multispectral image having a plurality of pixels, comprising:
providing a panchromatic image of the location, the panchromatic image having a p band;
for each pixel, with a computer, determining a vector x, the vector x having N spectral bands and comprising component xi where i is an index that runs from 1 to N;
with a computer, determining an intensity based on a length of vector x;
with a computer, determining a ratio of component xi to the intensity;
determining an adjusted component xi' using component xi;
using the adjusted component xi' to calculate an adjusted vector x' to pan sharpen each pixel to produce a sharpened multispectral image.

19. The method of claim 18, further comprising upsampling the multispectral image.

20. The method of claim 18, further comprising statistical matching of the p band to the intensity.

21. The method of claim 20, wherein the statistical matching is histogram matching.

22. The method of claim 18, wherein the method is performed without a forward transformation and a reverse transformation.

23. The method of claim 18, wherein the determining an adjusted component xi' using component xi comprises multiplying component xi by a ratio of the p band to the intensity.

24. The method of claim 18, further comprising smoothing the p band to produce a smoothed p band, and wherein the determining an adjusted component xi' using component xi comprises using component xi, the p band and the smoothed p band.

25. The method of claim 24, wherein the determining an adjusted component xi' comprises multiplying component xi by a ratio of the p band to the smoothed p band.

26. The method of claim 24, wherein the determining an adjusted component xi' comprises adding the component xi to a difference between the p band and the smoothed p band multiplied by a sharpening factor.

27. The method of claim 26, wherein the sharpening factor is a range of above zero to 2.

28. The method of claim 27, wherein the sharpening factor is equal to about 1.

29. A method of pan sharpening a multispectral image of a location, the multispectral image having N spectral bands, comprising;
providing a panchromatic image of the location, the panchromatic image having a p band;
with a computer, performing a forward transform of each of red, green and blue components for a pixel of the multispectral image to obtain hue, intensity and saturation bands, the intensity band having a level of spatial detail;
with a computer, generating a synthetic p band from the N spectral bands using a coefficient for each of N spectral bands based on a spectral overlap between the p band and each of the spectral bands;
with a computer, matching an intensity of the p band with an intensity of the synthetic p band, producing an intensity matched synthetic p band;
modifying the intensity band by a difference between the p band and the intensity matched synthetic p band;
obtaining a modified red component, a modified green component and a modified blue component using the modified intensity band; and
using the modified red, green and blue components to sharpen the multispectral image.

30. The method of claim 29, wherein the modifying the intensity band comprises multiplying the difference between the p band and the smoothed band by a sharpening factor.

31. The method of claim 30, wherein the sharpening factor is a range of above zero to 2.

32. The method of claim 31, wherein the sharpening factor is equal to about 1.

33. A non-transitory computer-readable medium operatively associated with an image processing system for pan sharpening a first multispectral image of an area, the first multispectral image forming a synoptic pair with a second multispectral image of the area, and each multispectral image comprising multiple spectral bands of M band groups, where M is a number of band groups in a range of 1 to M, the computer readable medium including program instructions that when executed by one or more processors of the image processing system, cause the processors to carry out the steps of:
    providing a panchromatic image of the area, the panchromatic image comprising a p band;
    for each band group m in the range of 1 to M:
        (a) upsampling band group m;
        (b) pan sharpening band group m using the p band;
        (c) producing a pan sharpened result for band group m; and
    continuing steps (a)-(c) to produce pan sharpened results for each band group from 1 to M; and
    fusing together the pan sharpened results for band groups 1 to M to produce a master fused image.

34. The computer readable medium of claim 33, wherein the pan sharpening comprises performing steps to implement one of hue-intensity-saturation enhanced pan sharpening, hue-intensity-saturation difference modulation technique pan sharpening, or in-place pan sharpening.

35. The computer readable medium of claim 34, wherein the pan sharpening comprises in-place pan sharpening that is performed without a forward transform and a reverse transform.

36. A non-transitory computer-readable medium operatively associated with an image processing system for pan sharpening a multispectral image of a location, the multispectral image having a plurality of pixels, the computer readable medium including program instructions that when executed by one or more processors of the image processing system, cause the processors to carry out the steps of:
    providing a panchromatic image of the location, the panchromatic image having a p band;
    upsampling the multispectral image;
    for each pixel, determining a vector x, the vector x having N spectral bands and comprising component $x_i$ where i is an index that runs from 1 to N;
    determining an intensity based on a length of vector x;
    determining a ratio of component $x_i$ to the intensity;
    determining an adjusted component $x_i'$ using component $x_i$;
    using the adjusted component $x_i'$ to calculate an adjusted vector x' to pan sharpen each pixel to produce a sharpened multispectral image.

37. The computer-readable medium of claim 36, wherein the steps are performed without a forward transformation and a reverse transformation.

38. The computer-readable medium of claim 36, wherein the steps comprise smoothing the p band to produce a smoothed p band, and wherein the determining an adjusted component $x_i'$ using component $x_i$ comprises adding the component $x_i$ to a difference between the p band and the smoothed p band multiplied by a sharpening factor.

39. The computer-readable medium of claim 38, wherein the sharpening factor is a range of above zero to 2.

40. A non-transitory computer-readable medium operatively associated with an image processing system for pan sharpening a multispectral image of a location, the multispectral image having N bands, the computer readable medium including program instructions that when executed by one or more processors of the image processing system, cause the processors to carry out the steps of:
    providing a panchromatic image of the location, the panchromatic image having a p band;
    performing a forward transform of each of red, green and blue components for a pixel of the multispectral image to obtain hue, intensity and saturation bands, the intensity band having a level of spatial detail;
    generating a synthetic p band from the N spectral bands using a coefficient for each of N spectral bands based on a spectral overlap between the p band and each of the spectral bands;
    matching an intensity of the p band with an intensity of the synthetic p band, producing an intensity matched synthetic p band;
    modifying the intensity band by a difference between the p band and the intensity matched synthetic p band;
    obtaining a modified red component, a modified green component and a modified blue component using the modified intensity band; and
    using the modified red, green and blue components to sharpen the multispectral image.

41. The computer-readable medium of claim 40, wherein the modifying the intensity band comprises multiplying the difference between the p band and the smoothed band by a sharpening factor.

42. The computer-readable medium of claim 41, wherein the sharpening factor is a range of above zero to 2.

* * * * *